(12) United States Patent
Shibata et al.

(10) Patent No.: US 8,764,930 B2
(45) Date of Patent: Jul. 1, 2014

(54) MANUFACTURING METHOD OF FLAT-PANEL DISPLAY DEVICE AND ADHESIVE-RESIN APPLICATION APPARATUS THEREFOR

(75) Inventors: Hideo Shibata, Tokyo (JP); Tatsuya Shinoda, Kanagawa (JP); Takayuki Iizuka, Ishikawa (JP); Yukinori Ueda, Ishikawa (JP); Susumu Otani, Ishikawa (JP); Toshifumi Shimizu, Nagano (JP)

(73) Assignee: Japan Display Central Inc., Fukaya-shi, Saitama (JP)

( * ) Notice: Subject to any disclaimer, the term of this patent is extended or adjusted under 35 U.S.C. 154(b) by 690 days.

(21) Appl. No.: 12/979,044

(22) Filed: Dec. 27, 2010

(65) Prior Publication Data
US 2011/0155318 A1 Jun. 30, 2011

(30) Foreign Application Priority Data
Dec. 25, 2009 (JP) ................. 2009-294731

(51) Int. Cl.
| | | |
|---|---|---|
| *B32B 17/00* | (2006.01) | |
| *B32B 17/10* | (2006.01) | |
| *C03C 27/00* | (2006.01) | |
| *G02C 7/00* | (2006.01) | |
| *B29C 65/00* | (2006.01) | |
| *B32B 37/00* | (2006.01) | |
| *B32B 38/04* | (2006.01) | |
| *B29C 65/48* | (2006.01) | |

(52) U.S. Cl.
USPC ........ 156/295; 156/99; 156/275.5; 156/275.7

(58) Field of Classification Search
USPC ......... 156/60, 87, 99, 104, 107, 272.2, 275.5, 156/275.7, 285, 286, 290, 291, 295
See application file for complete search history.

(56) References Cited

U.S. PATENT DOCUMENTS

| | | |
|---|---|---|
| 2007/0046874 A1 | 3/2007 | Adachi et al. |
| 2009/0186552 A1 | 7/2009 | Shinya et al. |
| 2009/0283211 A1* | 11/2009 | Matsuhira .................. 156/275.7 |

FOREIGN PATENT DOCUMENTS

| | | |
|---|---|---|
| CN | 101317205 | 12/2008 |
| JP | 9-8690 | 1/1997 |

(Continued)

OTHER PUBLICATIONS

English-language translation of the Notification of Grounds for Refusal issued by the Japanese Patent Office on Apr. 23, 2013.

(Continued)

*Primary Examiner* — Philip Tucker
*Assistant Examiner* — Brian R Slawski
(74) *Attorney, Agent, or Firm* — Finnegan, Henderson, Farabow, Garrett & Dunner, L.L.P.

(57) ABSTRACT

An embodiment of manufacturing method of a flat-panel display device having a display panel and a transparent protector sheet; comprises: setting a bi-directionally Y-shape branched line pattern within a rectangular to-be-bonded area, which is formed of two Y-shaped intersections of a center line and angle bisector lines of the corners, of the to-be-bonded area; and applying adhesive resin onto the protector sheet or onto the display panel by forming circular or ellipsoidal dot patterns of applied adhesive resin so that: the dot patterns are arranged on the center-line segment and on the branch lines or their vicinities; and the dot patterns are arranged in symmetry with respect to the center line and to its perpendicular bisector.

4 Claims, 9 Drawing Sheets

(56) References Cited

FOREIGN PATENT DOCUMENTS

| | | |
|---|---|---|
| JP | 9-133912 | 5/1997 |
| JP | 2004-224855 | 8/2004 |
| JP | 2004-325788 | 11/2004 |
| JP | 2005-55641 | 3/2005 |
| JP | 2007-47621 | 2/2007 |
| JP | 2009-48214 | 3/2009 |
| JP | 2009-91456 | 4/2009 |
| WO | WO 2007/063751 A1 | 6/2007 |
| WO | WO 2007063751 A1 * | 6/2007 ............... G06F 9/00 |
| WO | WO 2008/126893 A1 | 10/2008 |

OTHER PUBLICATIONS

First Office Action issued by State Intellectual Property Office of the People's Republic of China, dated Dec. 4, 2012 in Chinese application 201010621090.8, and its English translation.

* cited by examiner

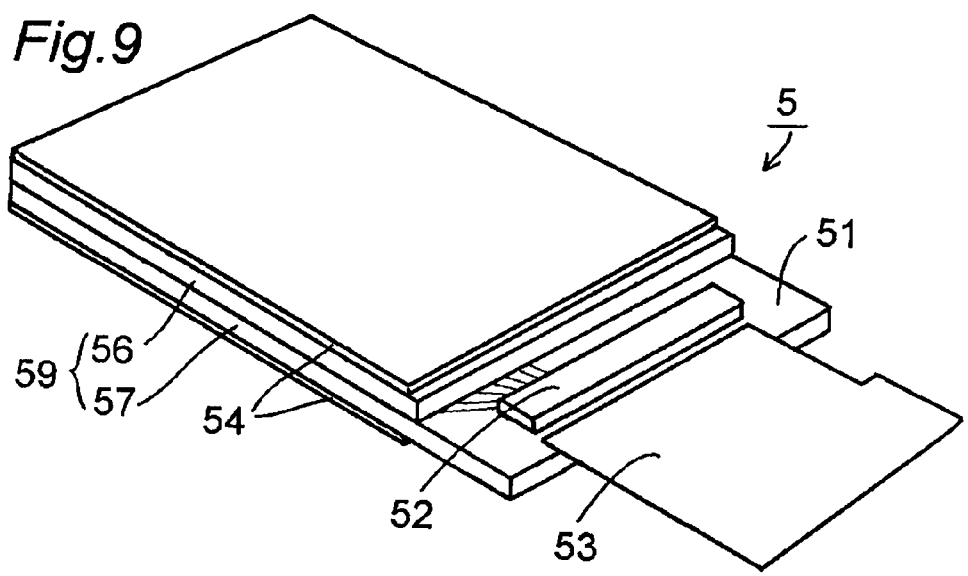
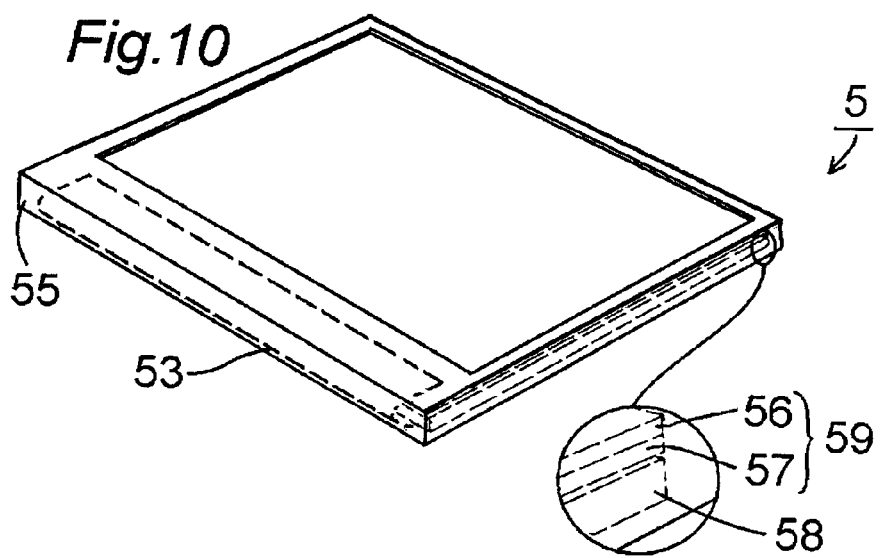

MANUFACTURING METHOD OF FLAT-PANEL DISPLAY DEVICE AND ADHESIVE-RESIN APPLICATION APPARATUS THEREFOR

CROSS-REFERENCE TO RELATED APPLICATION

This application is based upon and claims the benefit of priority from the prior Japanese Patent Application No. 2009-294731, filed on Dec. 25, 2009; the entire contents of which are incorporated herein by reference.

FIELD

Embodiments described herein relate generally to a method of manufacturing a flat-panel display device, which includes attaching of a protector sheet formed of transparent resin or glass, on a face having a viewing area, of a display panel in a liquid-crystal display (LCD) device or in some other flat-panel display device. The invention also relates to an apparatus for applying or coating of adhesive resin for the attaching, on the display panel or on the protector sheet.

BACKGROUND

The flat-panel display devices such as LCD (Liquid-Crystal Display) devices or OLED (Organic Light Emitting Diode) display devices are widely used in various fields such as computer displays, TV sets, car navigation devices, personal digital assistants (PDAs) and mobile phones. Transparent protector sheets are attached on screen faces of display devices in mobile equipments such as mobile phones and PDAs, in on-vehicle devices such as car navigation devices and in some computer devices. The protector sheet curbs scratching on the screen face to avoid disturbance of visibility, and curbs damaging of the display panel even at a time the display device is fallen to ground or undergoes a strong impact.

In general, the protector sheets have been attached on casings of electronic devices and thus a gap is formed between the protector sheet and the display panel. Please see JP 1997 (H09)-008690A (Japan's patent publication application No. H09-8690). Meanwhile, it has been proposed to attach or paste the protector sheets directly on the screen faces of the LCD devices. Please see JP2004-325788A, JP2005-055641A and US2007/0046874A (JP2007-047621A) and JP1997 (H09)-133912A. This is to cope with problems of light reflection on glass surface due to existence of air layer in the gap and to decrease production cost of the display device.

The JP2004-325788A discloses followings in respect of attaching the protector sheet on the display panel on course of producing the display device. Firstly, ultra-violet (UV) curing resin is applied on a predetermined area on the display panel or on the protector sheet. Subsequently, the display panel and protector sheet are pasted with and then pressed to each other in a chamber vacuumed to absolute pressure of about 50 Kpa or less. Thereafter, vacuuming is relieved, and then ultraviolet (UV) irradiation is made at a non-displaying periphery area on the display panel as to achieve a "temporary bonding". And, if a dust is found to be mingled in the adhesive layer by inspection using a CCD camera, the protector sheet is peeled off and then attaching of the sheet is made again. In the disclosed method, vacuuming is made at a time of pressing in order to curb inclusion of bubbles in the adhesive layer. Meanwhile, FIG. 4 of the JP2004-325788A shows following manners of applying the UV curing resin: dropping on only one circular dot at center; dropping on two to five circular dots having same diameter; dropping to form an X-shaped line pattern; and uniformly applying on whole of to-be-bonded area. The JP2004-325788A asserts in latter half of paragraph 0020 that; "As shown in FIG. 4, adoptable are one-dot dropping and multi-dots dropping, and no bubble inclusion is made by either of the methods."; and by "the multi-dots dropping or uniform applying on whole of the area", "decreasing of time for spreading the UV curing resin is achieved".

An LCD device disclosed in the JP2005-055641A has spacers that are formed of acrylic resin and are arranged on non-displaying peripheral area of the display panel at between the panel and the protector sheet; in order to achieve uniform thickness of a layer of adhesive that is filled and achieves adhesion between the display panel and the protector sheet. Meanwhile, the US2007/0046874A (JP2007-047621A) discloses an LCD device, in which "the protective plate includes fine concavity and convexity configurations on at least a surface thereof toward the display panel" (claim 1) so that "bubbles trapped . . . release from clearances between the concavities and convexities formed on the protective plate" (paragraph 0016).

Meanwhile, the JP1997(H09)-133912A discloses a vehicle-mounted LCD device that has a resin sheet having a pressure-sensitive adhesion property and a shock-absorbing property, at between the LCD panel and a protector plate, in place of the adhesive layer.

BRIEF DESCRIPTION OF THE DRAWINGS

FIG. 9 is a schematic perspective view showing an example of a small-size display panel that has been typical for years;

FIG. 10 is a schematic perspective view showing another example of the small-size display panel.

DETAILED DESCRIPTION

A manufacturing method, according to an embodiment of the invention, of a flat-panel display device that is comprised of: a display panel formed of a transparent insulator substrate; and a transparent protector sheet attached on viewing area of the display panel; comprises: applying of adhesive resin onto the viewing area of the display panel or onto the transparent protector sheet; assembling the display panel and the protector sheet so as to sandwich a layer of the adhesive resin; and curing of the adhesive resin sandwiched between the display panel and the protector sheet; further comprising: setting a bi-directionally Y-shape branched line pattern within a rectangular to-be-bonded area on the protector sheet or on the display panel, which is comprised of; a first Y-shaped intersection that is an intersection of two angle-bisector lines respectively of two corners sandwiching a first short side of the rectangular area, as well as two branch lines that are line segments respectively of the two angle bisector lines, between the two corners and the first Y-shaped intersection; a second Y-shaped intersection that is an intersection of two angle bisector lines respectively of two corners sandwiching a second short side of the rectangular area, as well as two branch lines that are line segments respectively of the two angle bisector lines, between the two corners and the second Y-shaped intersection; and a center-line segment that is a line segment of a center line of the rectangular area, at between the first and second Y-shaped intersections; and said applying of adhesive resin is made by forming circular or ellipsoidal dot patterns of applied adhesive resin so that; the dot patterns are arranged on the center-line segment and on the branch lines or their vicinities; the dot patterns are arranged in symmetry with respect to the center line and to its perpendicular bisector. According to a preferred embodiment, sum of areas or sum of applied resin amount of the dot patterns on the center line is 50-70% of total sum of areas or total some of applied resin amount of adhesive-resin application pattern on the rectangular area; and sum of areas or sum of applied resin amount of the dot patterns on the branch lines is 30-50% of said total sum of the areas or said total sum of the applied resin amount.

According to the embodiments of the invention, achievable are; curbing of inclusion of air bubbles in the adhesive layer; cutting down of production cost and improving of production efficiency; and decreasing of installation space required for production devices.

Figure 2:
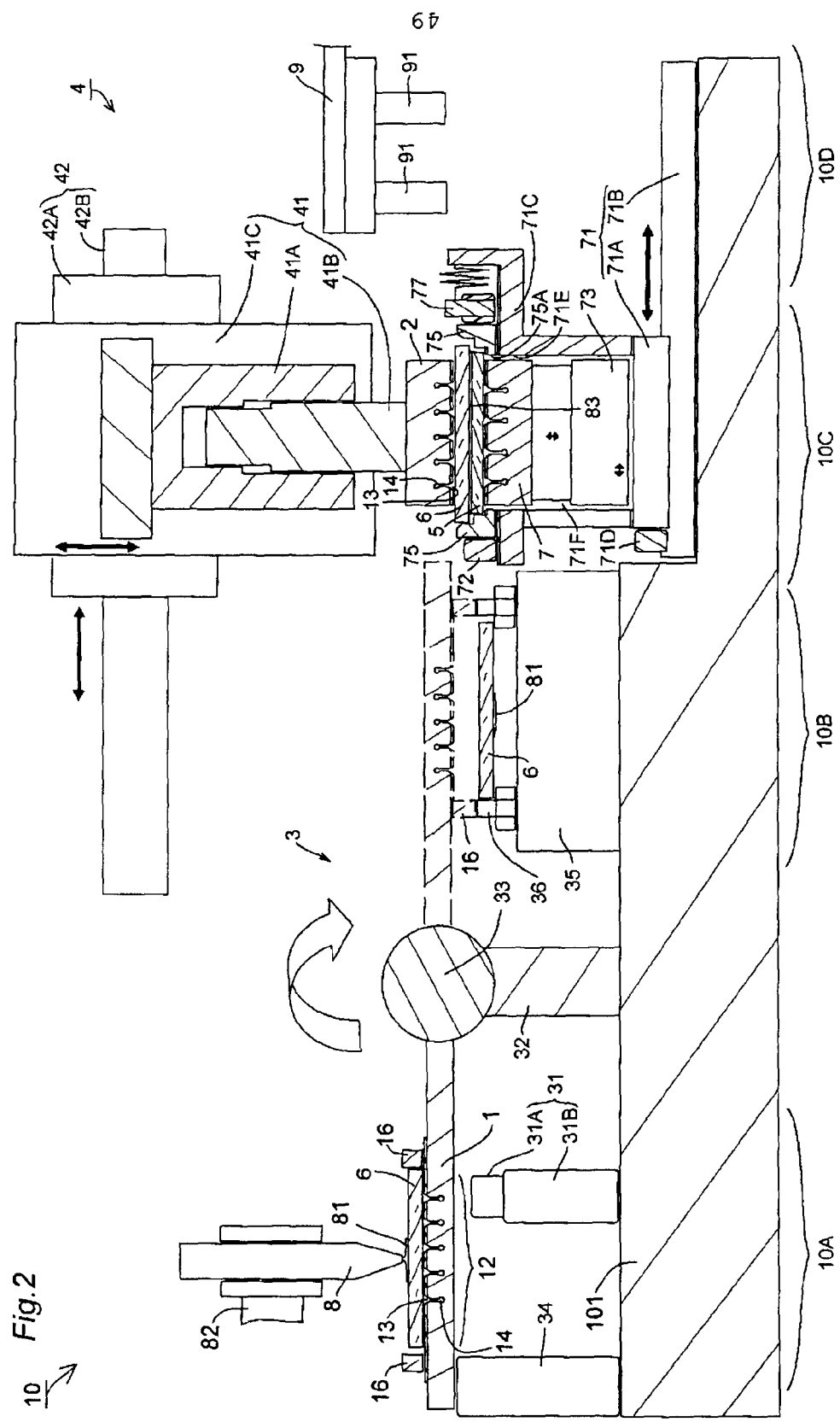
FIG. 2 is a vertical sectional view schematically showing a protector-sheet attaching apparatus that is adopted in an embodiment of the invention.
Figure 3:
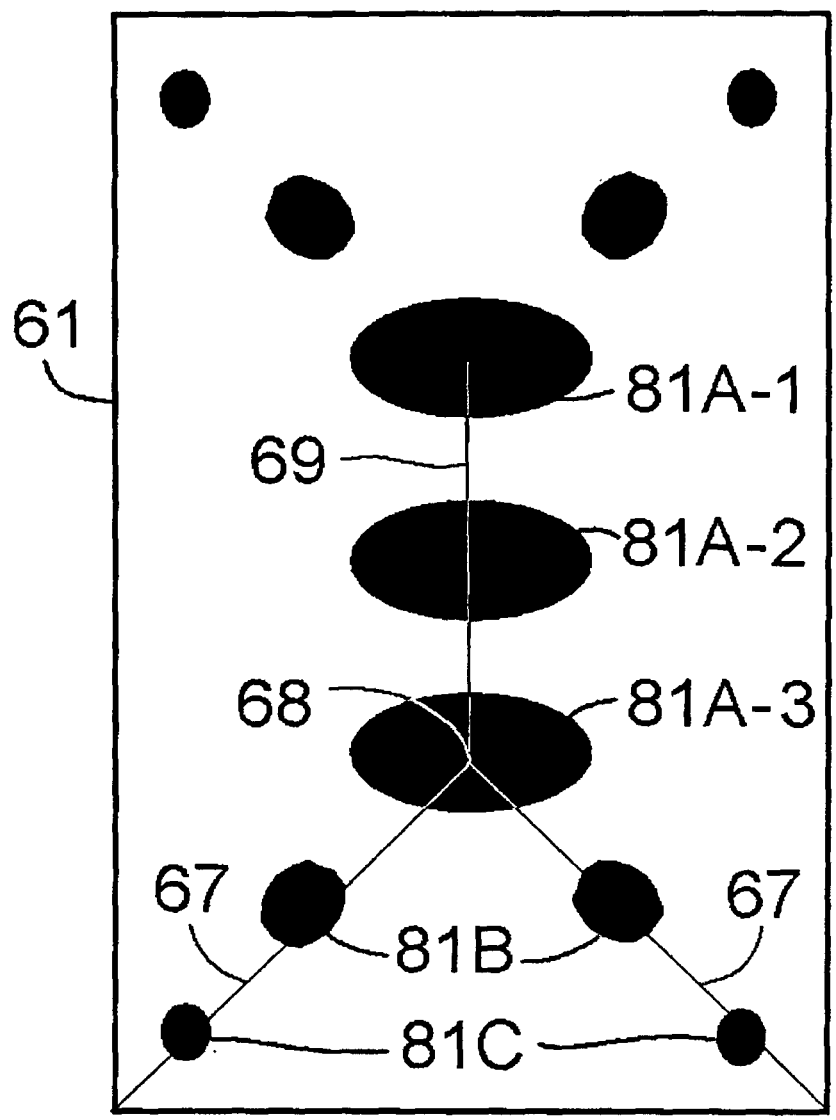
FIG. 3 is a plan view in same manner with FIG. 1, showing another example of adhesive-resin application pattern according to an embodiment of the invention.

The manufacturing method and apparatus disclosed in JP2004-325788A, on FIGS. 2-3 in particular, have a drawback that a press drive mechanism has to be arranged in a vacuum chamber, and thus, dimensions of the vacuum chamber are much larger than those of the display panel. Moreover, the display panel or the protector sheet having been applied with the adhesive resin has to be transferred into the vacuum chamber and then positioned and attached at predetermined position on a base plate of the press device. In particular, when the adhesive is applied onto whole of the to-be-bonded area as shown in FIG. 4(h), initial contacting between the protector sheet and the layer of the adhesive resin becomes surface-to-surface contact; and thus, vacuuming would be almost indispensable.

Meanwhile, structures of the LCD devices disclosed in JP2005-055641A and US2007/0046874A (JP2007-047621A) have a drawback that cost for elements or parts or cost for assembling is increased.

In otherwise, a resin sheet having press-adhesion property or a press-sensitive adhesion sheet may be adopted as in JP1997(H09)-133912A; then, it is required to establish a manufacturing method that enables efficient bonding without causing inclusion of air bubbles.

In view of the above problems, it is aimed to improve a manufacturing method including a process of attaching a protector sheet formed of glass or transparent resin onto a viewing face (a face including the viewing area) of the display panel as well as a manufacturing device for this method; in a manner to curb inclusion of air bubbles in the adhesive layer, to decrease production cost and increase production efficiency and to decrease a space required for installing the manufacturing devices.

A manufacturing method of an LCD device as well as apparatuses for the method, according to one embodiment of the invention, is explained in following in conjunction with FIGS. 1-10.

The LCD devices in this embodiment are small-sized ones that are now predominantly used in mobile devices such as mobile phones. For example, the LCD device has a viewing area having 2.4 to 2.8 inches of diagonal dimension and having 400×240 pixels for QWVGA resolution with 5/3 aspect ratio, or has a viewing area having 3.0 to 3.5 inches of diagonal dimension and having 800×480 pixels for WVGA resolution with 16/9 aspect ratio, or has a viewing area having 5.0 to 5.5 inches of diagonal dimension and having 1024×480 pixels for a half XGA resolution with 16/9 aspect ratio. In an example shown in FIG. 9, a display panel 5 has a terrace-shaped marginal connection area 51 that is a region on an array substrate 57 jutting out from a counter substrate 56, at one side of a rectangle shape of a display-panel main body 59. Onto the marginal connection area 51, one driver IC chip 52 and one flexible wiring board (FPC) 53 are mounted through an anisotropic conductive film (ACF). A polarizer sheet 54 is attached on each of obverse and reverse faces of the display panel 5. In an example shown in FIG. 10, a display panel 5 has a bezel cover 55 formed of metal and a backlight unit 58. In this application, term of the display panel is construed to encompass not only the examples shown in FIGS. 9-10 but also various ones including a one having driver ICs that are integrally formed on peripheral parts of the array substrate 57.

Figure 1:
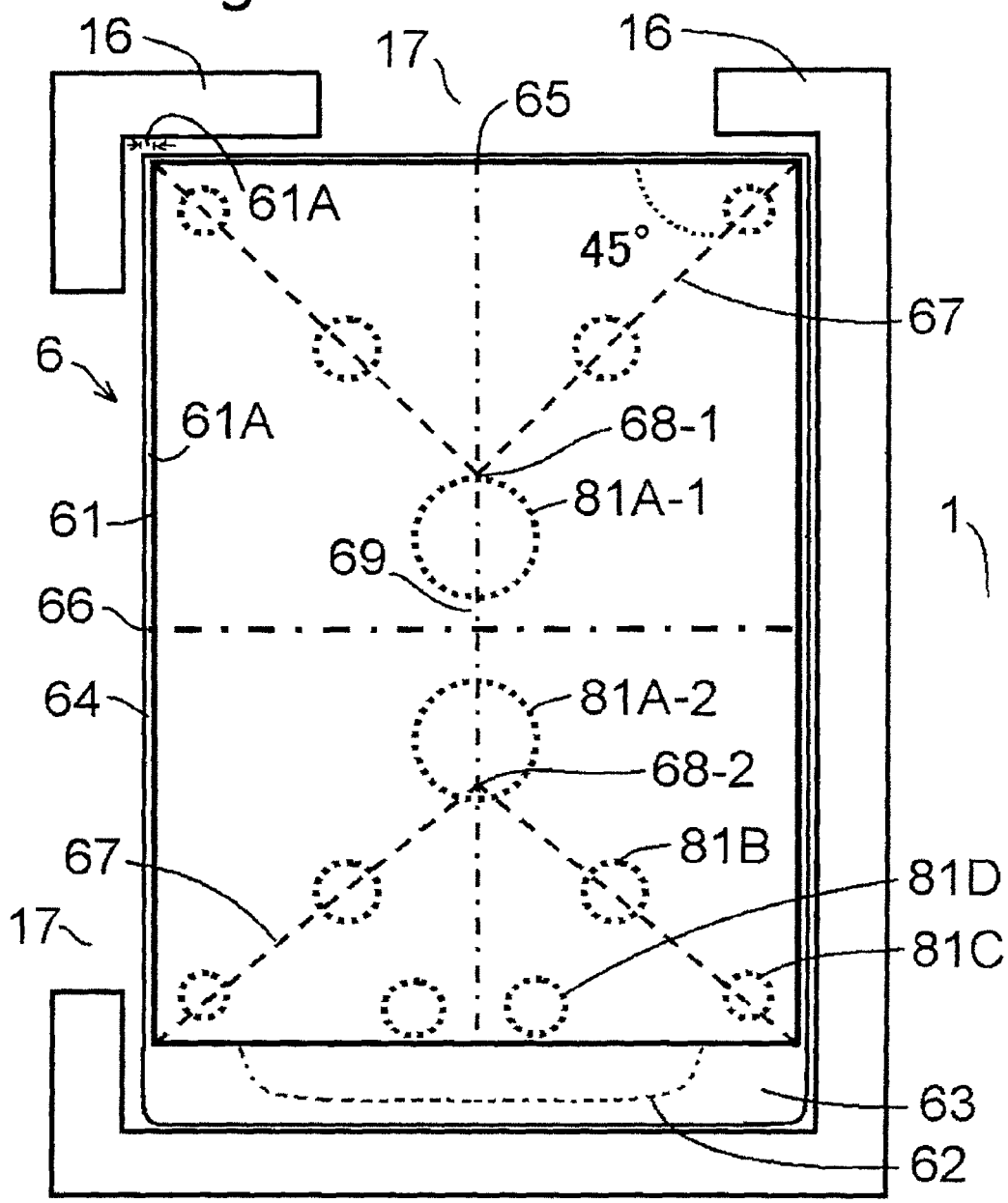
FIG. 1 is a plan view showing an example of adhesive-resin application pattern according to an embodiment of the invention, as well as positioning jigs on an adhesive-application stage or a first vacuum chuck.

A plan view of FIG. 1 shows a protector sheet 6 that is to be attached on the obverse face having the viewing area, as well as an example of adhesive-resin application pattern 81 formed on the protector sheet 6. A schematic vertical-sectional view of FIG. 2 shows over-all construction of a protector-sheet attaching apparatus 10 according to the embodiment.

The protector sheet 6 is a transparent resin plate formed of acrylic resin or polycarbonate resin, or a glass sheet, and has a thickness in a range of 0.5 to 1.0 mm for example. In a detailed example, the protector sheet 6 is an acrylic resin sheet having about 0.7 mm of thickness. Thus, as for adhesive layer, which attaches the protector sheet 6 formed of a resin onto the LCD panel 5 formed of glass, adopted is relatively large thickness of the adhesive layer for example, such as that in a range of 0.05 mm to 0.3 mm or that in a more specific range of 0.08 mm to 0.2 mm (80 μm to 200 μm). In a detailed example, the thickness of the adhesive layer is 0.1 mm (100 μm). As for the adhesive layer, adoptable is a resin composition that is comprised of; a UV-curing epoxy resin modified with silicone elastomer; and precipitated silica added as fillers. The adhesive resin liquid to be applied has a viscosity at 25° C. in a range of 1000-6000 mPa·sec in general, preferably in a range of 2000-4000 mPa·sec. The viscosity of the adhesive liquid is measured as following for example. BH-II viscometer of TOKYO KEIKI ("TOKIMEC") INC. is used; after the adhesive liquid is kept still, a rotor is rotated in the liquid; and then after 30 seconds of rotation, indicated value is read out. It should be noted that: measurement method and viscosity ranges mentioned here are for sake of example; and it is OK unless the resin would not flow down at a time the stage is inverted and unless application of the resin would become troublesome.

As shown in FIG. 2, the protector-sheet attaching apparatus 10 includes a first vacuum-chuck part as an resin-application stage 1, a second vacuum-chuck part as a press-clamping head 2 and a third vacuum-chuck part as a press-clamping stage 7. Each of these vacuum-chuck parts forms a horizontal vacuum-chuck face. The protector-sheet attaching apparatus 10 further includes: a first support-drive mechanism 3 that supports the resin-application stage 1; a resin-application nozzle 8 that applies the adhesive resin onto the protector sheet 6 held on the resin-application stage 2 at a time the stage 2 faces upward; a robot arm 82 that grabs and holds the resin-application nozzle 8; a transfer stage 35 that receives the protector sheet 6 having been applied with the adhesive-resin liquid, at a time the resin-application stage 1 is turned upside down. In an illustrated detailed example, the protector-sheet attaching apparatus 10 further includes: a second support-drive mechanism 4 that hung-wise supports the press-clamping head 2 and moves it vertically and horizontally; and a panel-laying table 71C that is provided with the press-clamping stage 7; and a third support-drive mechanism 71 that supports the panel-laying table 71C from downward.

As shown in FIG. 2, the protector-sheet attaching apparatus 10 that is comprised of: a resin-application station 10A that includes the resin-application stage 1, the resin-application nozzle 8 and the robot arm 82; a protector-sheet transfer station 10B that includes the transfer stage 35 and the first support-drive mechanism 3; an assembling station 10C that includes the press-clamping head 2, a vertical-drive mechanism 35 for vertically moving the press-clamping head 2, as well as the press-clamping stage 7; and a display-panel transfer station 10D that transfers the display panel 5.

As indicated in FIG. 2, a rectangular vacuum-chuck face or area 12 having substantially same dimensions is formed on each of the resin-application stage 1, the press-clamping head 2 and the press-clamping stage 7, which are respectively the first, second and third vacuum-chuck parts. On the each rectangular vacuum-chuck face 12, suction apertures 13 are arrayed in matrix; vacuuming by not-illustrated suction apparatus is applied to the apertures 13 through suction pipes 14 that are arranged at inside covered by the vacuum-chuck face 12.

The resin-application stage 1 is supported from a pedestal 101 of the protector-sheet attaching apparatus 10, through: a hinge supporter 32; and a hinge part 33 that is formed on one side of a rectangular shape of the resin-application stage 1. At along a distal side of the rectangular shape as opposite to the side on the hinge 33 and/or some other positions, the resin-application stage 1 is laid on and supported by a support part 34 if and when the resin-application stage 1 is in an initial state the vacuum-chuck face 12 faces upward. At this initial state, the resin-application stage 1 is fixed by a magnet mechanism or some other temporal steadfasting mechanism, onto the support part 34. A frame-shaped jig 16, which is for positioning the protector sheet 6 at predetermined position on the vacuum-chuck face 12, is attached on the vacuum-chuck face 12 by screwing or some other fixing mechanism. Inner dimensions of the frame-shaped jig 16, which means length and width dimensions of areal space surrounded by the jig, are set to be slightly larger than respective dimensions of the protector sheet 6. The protector sheet 6 is duly positioned when having been pushed toward a corner of the jig 16 to abut on inner faces of it. As shown in FIG. 1, the frame-shaped jig 16 has omitted portions on a rectangular shape at its sides opposed to the corner to leave an L-shaped corner part, in a manner to form interspaces 17 for push-positioning. These interspaces 17 facilitate operation of setting of the protector sheet 6 onto the vacuum-chuck face 12 of the resin-application stage 1. Once the protector sheet 6 is placed at a prescribed position, air suction for vacuum-chucking is initiated to fasten the protector sheet 6. If a robot arm having a vacuum chuck holding the protectors sheet 6 is used for setting it, the interspaces 17 are not needed. Meanwhile, the L-shaped corner part illustrated on top-left part on FIG. 1 may be omitted from the frame-shaped jig 16.

Once the protector sheet 6 is positioned and vacuum-chucked, the resin-application nozzle 8 drips or discharges the adhesive-resin liquid while being moved by the robot arm 82, as to form a prescribed resin-application pattern 81. Almost whole area of the protector sheet 6 is to-be-bonded area 61 except for a jetty or terrace area 63 on a short side of the rectangular shape. In general, there are minimal margins between the to-be-bonded area 61 and contour of the protector sheet 6 at along two long sides and one short side opposite to the terrace area 63. And, in many occasions, a black printed pattern 61A is provided to run along whole fringes of the to-be-bonded area 61. The black printed pattern 61A typically extends in its width direction from region overlapped with fringe portions of the to-be-bonded area 61 to fringe of the protector sheet 6, in a manner to curb undesirable leak of light through fringe portions of the LCD device. In an occasion the black printed pattern 61A has a large width dimension no less than 5 mm for example; the fringe of the to-be-bonded area 61 may be arranged to be inwardly distanced from outer fringe of the black printed pattern 61A. In this way, after curing of the adhesive resin, a gap space on the black printed pattern 61A may be filled only at its inner part, with the cured adhesive resin.

As the resin-application nozzle 8 and the robot arm 82, adoptable with some modification on setting is a dispenser system such as that used for applying of sealing material, which fluid-tightly close up gap space between the array and counter substrates. For example, adoptable is "The DispenseMate 580 Series Dispensing Systems (D-580)" equipped with image processing system, of Nordson ASYMTEK.

The resin-application pattern 81, which is formed on the protector sheet 6, is formed of one or more of dot patterns 81 that are arranged so as to fully let out air on course of squeezing of the adhesive resin layer and extending and enlarging of the dot patterns. In particular, adopted is a rule for their arranging. In a present embodiment, adopted as a rule is one based on a "bi-directionally Y-shape branched line pattern" and having some terms on areal ratios etc. In a preferred embodiment, the dot patterns are arranged in accordance with following rule. Please see FIG. 1 and FIG. 3.

1) Each of the dot patterns 81A, 81B, 81C and 81D is circular or elliptical.

2) The dot patterns 81A, 81B, 81C and 81D are arranged to be symmetric about a center line 65 of the to-be-bonded area 61 and about a perpendicular bisector 66 of the center line 65. This has an exception that a pair of the dot patterns 81D is arranged only along the terrace area 63. These dot patterns 81D are designed so that: the adhesive resin is squeezed out to an area 62 that covers a driver IC chip 52 and its surroundings; and thus, the protector sheet 6 is bonded onto upper face of the driver IC chip 52. In this way, a structure for joining up the display panel 5 and the protector sheet 6 is consolidated; and thus, anti-shocking performance of the LCD device is enhanced. These two dot patterns 81D are arranged to close to corners formed between the center line 65 and the fringe of the to-be-bonded area 61 and are in symmetry about the center line 65. The dot patterns 81D for such structural reinforcing is not necessarily required to be arranged and may be omitted, according to designing of the flat-panel display device.

3) Each of the dot patterns 81A, 81B and 81C is centered on or in vicinity of a "bi-directionally Y-shape branched line pattern" that is defined as follows. This has an exception that the dot patterns 81D for the structural reinforcing are excluded from this rule when such dot patterns 81D are arranged.

Figure 5:
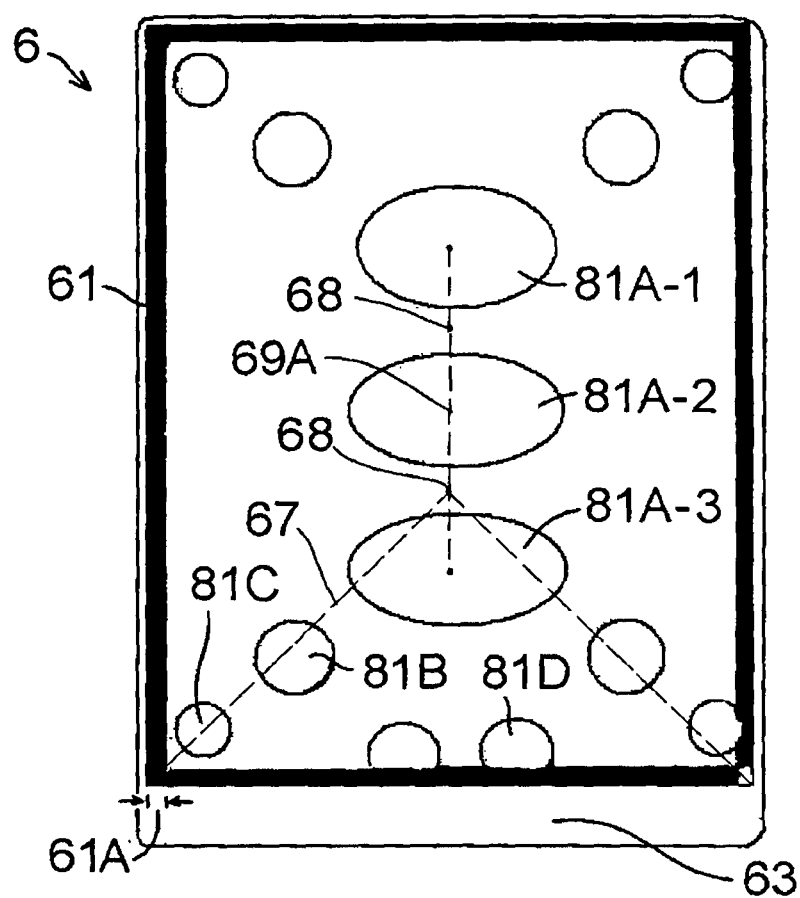
FIG. 5 is a plan view in same manner with FIGS. 1 and 3, showing a still other example of an adhesive-resin application pattern.

Firstly, for each of the four corners of the to-be-bonded area 61, drawn is an angle bisector, which bisects a corner angle of the area 61 and forms 45° angle with a long side and short side of the area 61. Then, first Y-shaped intersection 68-1 is defined as a point at which joined are the two angle bisectors that bisects the corner angles on a short side opposed to the terrace area 63; and second Y-shaped intersection 68-1 is defined as a point at which joined are the two angle bisectors that bisects the corner angles on another short side along the terrace area 63. Each branch line 67 is defined as a line segment of the angle bisector, running from the corner to the Y-shaped intersection 68, or connecting the corner with the center line 65. And, a center-line segment 69 is defined as a line segment running from one to another of the first and second Y-shaped intersection 68-1 and 68-2. The "bi-directionally Y-shape branched line pattern" is consisting of: the center-line segment 69 or modified center-line segment 69A (as shown in FIG. 5); and the four branch lines 67 that runs from ends of the center-line segment 69 or the modified center-line segment 69A.

The center-line segment 69 is modified if necessary; especially if aspect ratio (length-by-width ratio) of the to-be-bonded area 61 is in a range of 1.2 to 1.35 or of 1.7 to 2.2, to be elongated or contracted by about ⅓ of length or 20-45% of length of the to-be-bonded area 61. For example, if the aspect ratio is in a rage of 1.2 to 1.35 and, in same time, areal ratio of total area of the resin-application pattern 81 to total area of the to-be-bonded area 61 is in a range of 15% to 20%; the center-line segment 69 is elongated outward from the Y-shape intersections 68 to have a length in a range of 35% to 45% of the length of the to-be-bonded area 61. Meanwhile, if the aspect ratio is in a range of 1.7-2.2, the center-line segment 69 is contracted to become shorter than a distance between the Y-shape intersections 68 to have a length in a range of 25% to 35% of the length of the to-be-bonded area 61. Such an elongated or contracted one of the center-line segment 69 is to be referred as the modified center-line segment 69A. Even with such modified one, resin-application pattern is also to be referred as the "bi-directionally Y-shape branched line pattern".

4) Dispensing amount of the dot patterns 81A on the center-line segment 69 is in a range of 50% to 70% of total dispensing amount. Thicknesses of dispensed resin liquid of the dot patterns 81A, 81B, and 81C are almost same with each other; thus, areal ratios among these are substantially same with respective ratios of dispensing amounts among these. Hence, alternatively adoptable is a rule that areal ratio of the dot patterns 81A on the center-line segment 69 is in a range of 50% to 70% of total area of the resin-application pattern 81 except the dot patterns 81D for the driver IC chip; that is, sum of areas of the dot patterns 81A, 81B and 81C. If the dot patterns 81D for the driver IC chip are arranged, these dot patterns 81D are excluded from the above calculation of the amount ratio or the areal ratio.

5) Each of the dot patterns 81A on the center-line segment 69 is shaped as a circle or as an ellipsoid whose minor axis overlaps the center-line segment 69. If a plurality of the dot patterns 81A is arranged, areal sizes of the dot patterns are same with each other. Flattening ([major axis−minor axis] ÷major axis) of contour of the dot pattern 81A is in a range of 0 to 2.0. In an example, distance between the dot patterns 81A on the center-line segment 69 is 0.3 to 0.7 time of diameter or major axis of the dot patterns 81A.

This has a following exception. If the aspect ratio of the to-be-bonded area 61 is in a range of about 1.1 to 1.2, number of the dot pattern 81A of the center-line segment 69 is only one and the major axis of the dot pattern 81A overlaps the center-line segment 69. In an example, the flattening of the ellipsoid or other ovoid such as race-track shape is in a range of 0.05 to 0.5.

If number of the dot patterns 81A of the center-line segment 69 is three, shape and size of one on center point may be set to be different with those of ones distanced from the center point. In an example, the dot pattern 81A on the center point has a minor axis smaller than that of each of the remaining dot patterns 81A and has a major axis same with those for the remaining dot patterns.

6) On each of the branch lines 67, arranged are a plurality of the dot patterns. In particular embodiments, arranged are two dot patterns 81B and 81C, and inner one is larger than outer one in respect of dispensed resin amount or of areal dimension. On the center-line segment 69 is only one; and ratio of the dispensed resin amount or the areal dimension is in a range of 1.5 to 2.5.

7) Each of the dot patterns 81D arranged only along the terrace area 63 is arranged within the to-be-bonded area 61 as close to an intersection of the center line 65 with a border line between the to-be-bonded area 61 and the terrace area 63. These dot patterns 81D are designed to have the dispensed resin amount or the areal dimension in a manner that adhesive resin liquid to be squeezed out at a time of press-clamping is enough or just enough to completely fill up a gap between the driver IC chip 52 and the protector sheet 6 so as to achieve a mechanical juncture between whole top surface of the driver IC chip 52 and the protector sheet 6. More preferably, the amounts or the areal dimensions are designed so that the adhesive resin liquid also covers whole surrounding of the driver IC chip 52 on its lateral sides, to achieve covering and sealing off of terminals of the driver IC chip 52 and terminals on the terrace-shaped marginal connection area 51 of the display panel 5.

In following, it is explained a mechanism of assembling and pressing the protector sheet 6 having the resin-application pattern 81, onto a display panel 5.

As shown in right-hand-side half of the FIG. 2, the second support-drive mechanism 4 supports the press-clamping head 2 from upward, and is supported by a not-illustrated pedestal 101 of the protector-sheet attaching apparatus 10. The second support-drive mechanism 4 is comprised of: a vertical-drive supporter 41 that is formed of a servo mechanism and a driving source and moves up and down the press-clamping head 2; and a horizontal-drive supporter 42 that supports the vertical-drive supporter 41 and the press-clamping head 2 and moves them in a right-left direction of the FIG. 2. In an illustrated detailed example, the vertical-drive supporter 41 includes an air cylinder that is for applying a predetermined level of pressure at a time of the pressing; and a cylinder rod 41A connected with a center part of the press-clamping head 2 is fitted into a cylinder barrel 41B. The air cylinder also includes a not-illustrated diaphragm that seals off an air chamber, and so on. Upper end of the cylinder barrel 41B is connected with a vertically-moving drive end of a vertical-drive part 41C having a servo mechanism.

In an illustrated example, the horizontal-drive supporter 42 is comprised of: a horizontal slider 42A, into which a vertically-non-moving support end of the vertical-drive part 41C is fitted; a horizontal rail 42B that is engaged with horizontal slider 42A and is supported as fixed from the pedestal 101 of the apparatus 10; and a not-illustrated horizontal drive mechanism that is connected with the horizontal slider 42A. In an example, the horizontal slider 42A is comprised of a pneumatic cylinder and a servo actuator such as servo motor so that: in right-left direction of FIG. 2, achieved are; quick horizontal motion by the pneumatic cylinder as well as positioning by the actuator with the servo actuator. Though not illustrated, the vertical-drive supporter 41 may have a guide mechanism for keeping a bottom face of the press-clamping head 2 as horizontal, if necessary. In an example, flanges or horizontal supporter plates are extended from upper part of the press-clamping head 2; and a plurality of vertical guide rods supported from the horizontal slider 42A or from the pedestal 101 are penetrated through holes on the flanges or the supporter plates.

In a detailed example, the press-clamping stage 7 is attached on top of a positioning table 73 as illustrated in FIG. 2. The positioning table 73 is a "XYθ stage" that enables fine-tune positional adjustment in two orthogonal axes (X and Y axes) in horizontal plane as well as rotational (θ) direction about vertical axis. Moreover, there is arranged a vertical actuator for "Z-axis" motion, which enables switching of position of the press-clamping stage 7 between its risen-up position and sunken position. Meanwhile, the panel-laying table 71C is supported as horizontally movable from the pedestal 101 through a third support-drive mechanism 71; has an opening 71E on top face, through which the press-clamping stage 7 is movable, and has a cavity 71F that accommodates the positioning table 73 and the press-clamping stage 7.

In an embodiment, movable part of the third support-drive mechanism 71 is connected with the positioning table 73 and the press-clamping stage 7 as well as the panel-laying table 71C; and these are moved by the third support-drive mechanism 71 at a time the positioning table 73 and the press-clamping stage 7 are accommodated in the cavity 71F. In an alternative embodiment, the positioning table 73 and the press-clamping stage 7 are directly supported by the pedestal 101 and are not horizontally movable. In this alternative embodiment, the positioning table 73 and the press-clamping stage 7 are brought into the cavity 71F, through a side-face opening 71G on bottom part of the panel-laying table 71C; at a time the panel-laying table 71C is moved by the third support-drive mechanism 71 after panel-laying table 71C have received on its top face a display panel 5, at the display-panel transfer station 10D. Then, the press-clamping stage 7 is raised as emerged through the opening 71E on the top face and vacuum-chucks the display panel 5.

Figure 6:
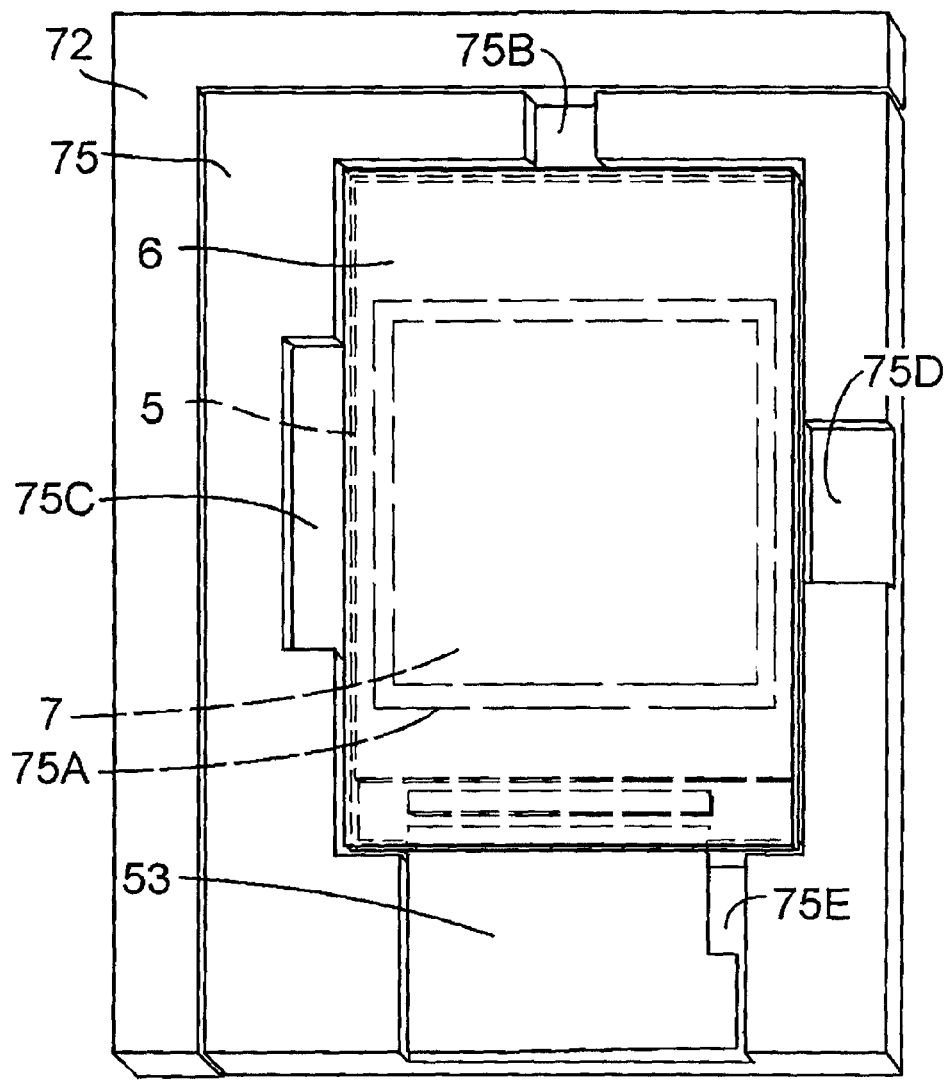
FIG. 6 is a schematic perspective view showing a tray-shaped jig and a positioning jig on a press-clamping stage or third vacuum chuck that are used in an embodiment of the invention.
Figure 7:
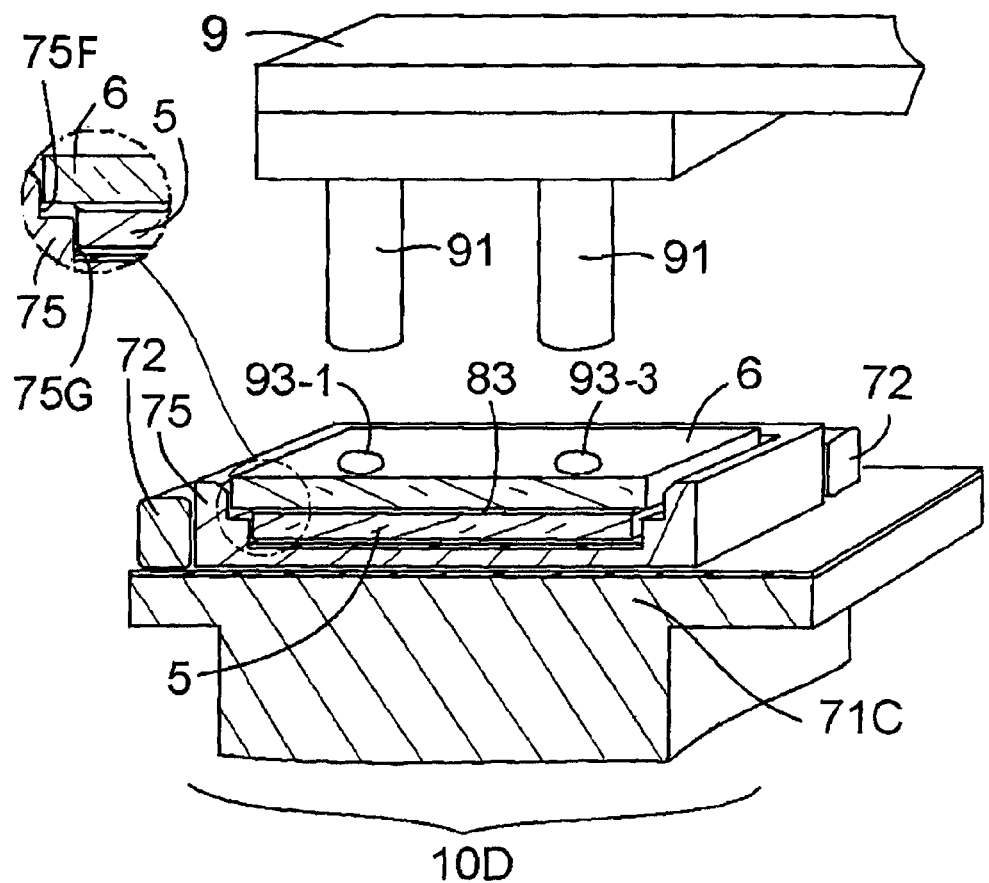
FIG. 7 is a schematic perspective view showing a process of temporary fixing between the display panel and the protector sheet by spot-wise UV irradiation.

As shown in FIGS. 2 and 6-7, on top face of the panel-laying table 71C, held is a tray-shaped alignment jig 75 that receives the display panel 5. On course of the press-clamping, not only the display panel 5 but also the protector sheet 6 is placed in the alignment jig 75. In FIGS. 2 and 6, the alignment jig 75 has on its bottom face, an opening 75A that is illustrated as congruent or nearly congruent with the opening 71E of the panel-laying table 71C; and the top face of the table 71C is provided with a positioning jig 72 having an L-shape in a plan view, which serves for positioning the alignment jig 75 with respect to the panel-laying table 71C. The alignment jig 75 is placed at a predetermined position on the table 71C when abutted onto the positioning jig 72. In an example illustrated in FIG. 2, there is arranged on the table 71C, a presser unit 77 that horizontally presses the alignment jig 75 onto the positioning jig 72. In an illustrated detailed example, the presser unit 77 is comprised of: an upward projection extended from a fringe of the table 71C; a spring fixed on inner face of the upward projection; and a presser piece attached on an end of the spring. In a detailed example shown in FIG. 6, a rectangular frame-shaped part of the alignment jig 75 has recesses 75B, 75C and 75D for grabbing the panel, each of which is formed along a center portion of respective one of three sides of the display panel 5. Through such recesses 75B, 75C and 75D, fingers of an operator are inserted to pick up the display panel 5, if required. Along a remaining side of the rectangular display panel 5, a recess 75E having a large areal size is provided to receive a flexible printed circuit board (FPC) 53.

As shown in FIG. 2, the third support-drive mechanism 71 that supports and horizontally moves the panel-laying table 71C is comprised of: a slider 71A, on top of which the table 71C is fixed; a horizontal rail 71B that engages with the slider 71A and is fixed on the pedestal 101; and a not-illustrated horizontally driving mechanism that is connected with the slider 71A. In an example, the horizontally driving mechanism is formed of a pneumatic cylinder; and by actuation of such cylinder, the press-clamping stage 7 as the third vacuum-chuck part is quickly moved from the assembling station 10C to the display-panel transfer station 10D and vice versa. When to be moved, the press-clamping stage 7 is lowered below the table 71C. In a detailed example illustrated in FIG. 2, an abutting stopper 71D is formed on each end of the rail 71B so that the stage 7 is duly positioned at a time having been quickly moved in right-left direction between the two stations 10C and 10D.

FIG. 7 shows a state the display panel 5 and the protector sheet 6 are aligned with each other within the alignment jig 75; and spot irradiation of UV light in such state. As schematically shown in an enlarged portion of FIG. 3, the display panel 5 and the protector sheet 6 are clamped together to sandwich a not-cured adhesive resin layer 83 and to be stuck with each other; and after or on course of such clamping, edges of the display panel 5 and the protector sheet 6 are respectively abutted with positioning faces 75G and 75F on inner face of the alignment jig 75 so as to achieve alignment between the display panel 5 and the protector sheet 6. Thus, as in same manner with positioning of the alignment jig 75 as illustrated in FIG. 6, the alignment is made at a time the display panel 5 and the protector sheet 6 are pressed toward a corner of the alignment jig 75, especially toward the corner of the L-shaped positioning jig 72. In an example, such pressing for positioning on a process of press-clamping is made as follows. After the resin liquid on the adhesive-resin pattern 81 at beneath of the protector sheet 6 is just contacted with obverse face of the display panel 5; and before making non-preliminary press-clamping; the display panel 5 and the protector sheet 6 are released from vacuum-chucking, and then, are side-wise pressed toward the corner of the alignment jig 75, by inserting fingers through the recesses 75D and 75E on front and right-hand sides. If the positioning is made in this way, the positioning table 73 may be omitted.

In such aligned state, UV-light spot irradiation is made on predetermined spots 93 by use of spot-irradiation device 9; and resultantly, achieved is a "temporary fixing", or fixing of the protector sheet 6 onto the display panel 5 to keep their aligned state. The spot irradiation may be made at a state the panel-laying table 71C and the alignment jig 75 are out of the assembling station 10C, and may be made at the panel-transfer station 10D.

An assembly formed of the display panel 5 and the protector sheet 6 is firstly subjected to such spot irradiation to fix them with each other in the aligned state; then removed from the alignment jig 75; and sent to full irradiation station, at which whole area of the assembly is irradiated with UV light, or to heat chamber, in which the adhesive layer is cured by heating. The assembly may be taken out from the jig 75 at the panel-transfer station 10D; or the jig 75 with the assembly in it may be taken out from the panel-laying table 71C. In certain circumstance, the jig 75 with the assembly may be placed in a UV irradiation chamber or in the heat chamber.

In following, explained is a process flow of attaching the protector sheet 6 onto the display panel 5 according to an embodiment of the invention, in conjunction with FIG. 2.

1) 1st Step: Setting and Aligning of the Protector 6 on the Stage 1

At a time the resin-application stage 1 as the first vacuum-chuck part is in initial position, the protector sheet 6 is placed in the frame-shaped jig 16 on the stage 1. And, fingers are inserted through the interspaces 17 appeared on top and left sides on FIG. 1, of the frame-shaped jig 16 to push the protector sheet 6 toward the corner appeared on bottom-right part on FIG. 1. In this way, positioning of the protector sheet 6 with respect to the stage 1 is made. When such positioning is completed, vacuuming through then vacuum-chucking face 12 is made to secure the protector sheet 6 on the stage 1.

2) 2nd Step: Application of Adhesive Resin

The adhesive-resin liquid is discharged from the nozzle 8 while actuating the robot arm 82 so that a predetermined resin-application pattern 81 is formed on the protector sheet 6.

3) 3rd Step: Reversing and Holding of the Protector 6

At a time applying of the resin liquid has been completed, the resin-discharging nozzle 8 is returned to its initial position by the robot arm 82; and then, the resin-application stage 1 is turned upside down. For reversing of the stage 1, actuated is an ejector 31 that is comprised of an ejector pin 31A formed of a resin and a pneumatic cylinder 31B. After the reversing, vacuum suction for holding on the resin-application stage 1 is stopped; and the protector sheet 6 is handed over to the transfer stage 35. When handed over, the protector sheet 6 is kept at a predetermined position horizontally; and its face applied with the resin-application pattern comes to beneath of the sheet. Then, in the illustrated example, the resin-application stage 1 is supported from below at the frame-shaped jig 16 by support pins 36. Meanwhile, the resin-application stage 1 is turned upside down, back to initial position by a not-illustrated ejector same or similar with the illustrated ejector 31.

4) 4th Step: Feeding into the Assembling Station

The press-clamping head 2 as the second vacuum-chuck part is quickly transferred by actuation of the horizontal support-drive mechanism 42 to a position directly above the transferring stage 35. Then, by actuation of the vertical-drive part 41C, the press-clamping head 2 is brought in contact with outer face, or top face in this state, of the protector sheet 6. When thus abutted, the vacuum-chucking on the head 2 is activated to hold the protector sheet 6. Just after this, the press-clamping head 2 is slightly lifted by the vertical support-drive mechanism 41; and is returned to initial position for press-clamping by the horizontal support-drive mechanism 42. Alternatively, the horizontal support-drive mechanism 42 may be omitted; and then, a robot arm or an operator holds the sheet 6 at its ends and brings it up and then in contact with the press-clamping head 2 so that the sheet 6 is vacuum-chucked as duly positioned on the head 2.

Simultaneously with moving of the press-clamping head 2 to the position just above the transfer stage 35; the panel-laying table 71C is moved in opposite direction by the third support-drive mechanism 71 formed of a pneumatic cylinder or the like, to rightward end in FIG. 2. At there, the table 71C is loaded with the alignment jig 75 that has been loaded with a display panel 5; and on course of it, the alignment jig 75 is pushed into and abutted with a corner of the L-shaped positioning jig 72. And, the display panel 5 is pushed into a corner part of the alignment jig 75 that corresponds to the corner of the L-shaped positioning jig 72. Resultantly, the display panel 5 is duly positioned with respect to the panel-laying table 71C. Subsequently, the panel-laying table 71C is returned to the press-clamping position simultaneously with that the press-clamping head 2 is returned to there. Then, at this time point, the press-clamping stage 7 is advanced through the opening 75A to abut with the display panel 5 and immediately hold it with the vacuum-chucking.

5) 5th Step: Pressing for Bonding

Pressing procedure is initiated after confirming a rough alignment between the panel 5 and the sheet 6. Firstly, the head 2 is moved down as quickly as possible until just before that: lowermost tip of the resin liquid on the resin-application pattern 81, which is attached on bottom face of the protector sheet 6, is contacted with top face of the display panel 5. Subsequently, the head 2 is slowly moved down so that the lowermost tip on the resin-application pattern 81 is slowly brought in contact with the top face of the panel 5. After such preliminary press-clamping, vacuum-chucking of the sheet 6 on the head 2 is stopped; and the protector sheet 6 is pushed into the corner of the tray-shaped alignment jig 75, which corresponds to the corner of the L-shaped positioning jig 72. Thereafter, moving down of the head 2 is resumed to initiate non-preliminary press-clamping, by which: firstly the head 2 is quickly moved down so that air bubbles are released from the adhesive-resin layer 83; and subsequently, moving down of the head is stopped and pressing in-situ or stand-still state is continued for a predetermined period. When such non-preliminary pressing is completed, the press-clamping head 2 is moved up and the press-clamping stage 7 is moved down.

6) 6th Step: Sending Out of Pressed Assembly

When moving up of the head 2 has started, the panel-laying table 71C is moved to a position of transferring the display panel 5. At this position as shown in FIG. 7, some dot portions of the adhesive-resin layer 83 is irradiated with UV light to be cured only at such dot portions as to achieve a "temporary fixing". When the dot portions to be irradiated with UV light are set as irradiation spots 93 illustrated in FIG. 7, adoptable is a spot-irradiation device 9 having four spot-wise UV light-sources 91 formed of LEDs or the like. At a time point such spot irradiation is finished, the positioning jig 75 loaded with the assembly of the panel 5 with the sheet 6 is taken out from the panel-laying table 71C. Then, the positioning jig 75 loaded with a new display panel 5 to be attached with the protector sheet 6 is placed as positioned again on the panel-laying table 71C, which is then returned to the press-clamping position. As the spot-irradiation device 9, adoptable are for example: "high-power UV-LED irradiation device UV-400" (365 nm) of Keyence Corporation; and "UV-LED spot light source LIGHTNINGCURE LC-L1" (365 nm) of Hamamatsu Photonics K.K. If the alignment jig 75 mounted with the assembly of the display panel 5 and the protector sheet 6 is sent into a UV irradiation chamber as to proceed a following 7th step; then omittable are procedures of the "temporary fixing" using spot-wise UV irradiation.

7) 7th Step: Curing of the Adhesive Layer

After the above "temporary fixing", the assembly is taken out from the positioning jig 75 and is sent into a UV irradiation chamber so that whole area of the adhesive-resin layer 83 is irradiated with UV light. Then, if necessary and as an extent as needed, the positioning jig 75 is kept in a heat-aging chamber or in a weathering-test chamber to complete the bonding.

In following, detailed explanation is made on some examples of the resin-application pattern 8 in conjunction with FIGS. 1 and 3-5. In the example shown in FIG. 1, each of the dot patterns of the resin-application pattern 81 is shaped as a circle and its center is arranged exactly on the fore-mentioned "bi-directionally Y-shape branched line pattern". In a more detailed example, to-be-bonded area 61 has a diagonal dimension of 2.8 inches and an aspect ratio of 1.42; number of the dot patterns 81A on the center-line segment 69 is two; diameters of the dot patterns are: 7.8 mm for the center-line dot patterns 81A on the center-line segment 69; 3.6 mm for inner-branch dot patterns 81B at relatively inner side on the branch lines 67; and 2.8 mm for outer-branch dot patterns 81C at relatively outer side on the branch lines 67. Resultantly, if the dot patterns 81D for the driver IC chip (to be referred as driver-IC dot patterns) is excluded, total area of the resin-application pattern 81 is divided into shares of: 60% for the center-line dot patterns 81A; 25% for the inner-branch dot patterns 81B; and 15% for the outer-branch dot patterns 81C. Diameter and areal dimension of the dot patterns 81D for the driver IC chip is same with those of the inner-branch dot patterns 81B. Hence, if the driver-IC dot patterns 81D are included, areal ratio or share of the center-line dot patterns 81A is 53% with respect to the total area of the resin-application pattern 81. Ratio of the total area of the resin-application pattern 81 with respect to total area of the to-be-bonded area 61 is: about 8% if the driver-IC dot patterns 81D is excluded; and about 9% if the driver-IC dot patterns 81D is included.

In the above example, center of each of the inner-branch dot patterns 81B is located in vicinity of a bisector of the branch line 67; and in an illustrated detailed example, the center is located at a point distanced from the Y-shape intersection 68 by 40% of length of the branch line 67. In the above example, center of each of the outer-branch dot patterns 81C is located in vicinity of a corner of the to-be-bonded area 61; and in the illustrated detailed example, the center is located at a point distanced from the Y-shape intersection 68 by 85% of the length of the branch line 67. In the illustrated detailed example, each of the driver-IC dot patterns 81D has an outer end abutting or nearly abutting fringe of the to-be-bonded area 61; and has a center distanced from the center line 64 by a dimension same with the diameter of the dot patterns 81D.

In an example shown in FIG. 3, each of the dot patterns 81A, 81B and 81C is shaped as an ellipsoid or an oval. Each of the center-line dot patterns 81A are exactly centered on the center-line segment 69; and each of the inner-branch and outer-branch dot patterns 81B and 81C is centered on a point slightly deviated from the branch line 67. A detailed example is as follows. The to-be-bonded area 61 has a diagonal dimension of 3.0 inch and an aspect ratio of 1.58; number of the center-line dot patterns 81A is three; these center-line dot patterns 81A-1, 81A-2 and 81A-3 have diameters and shapes same with each other and have same flattening of 0.46; and each of the center-line dot patterns 81A-1 and 81A-3 not on center point of the to-be-bonded area 61 is centered on a point near to the Y-shaped intersection 68. Each of the inner-branch dot patterns 81C has a flattening of 0.11 and has a major axis almost parallel to the associated branch line 67; and each of the outer-branch dot patterns 81D has a flattening of 0.19 and has a major axis almost parallel to a long side of the to-be-bonded area 61. Total area of the resin-application pattern 81 is divided into shares of: 69% for the three center-line dot patterns 81A; 22% for the four inner-branch dot patterns 81B; and 9% for the four outer-branch dot patterns 81C. Ratio of the total area of the resin-application pattern 81 with respect to total area of the to-be-bonded area 61 is about 12%.

Figure 4:
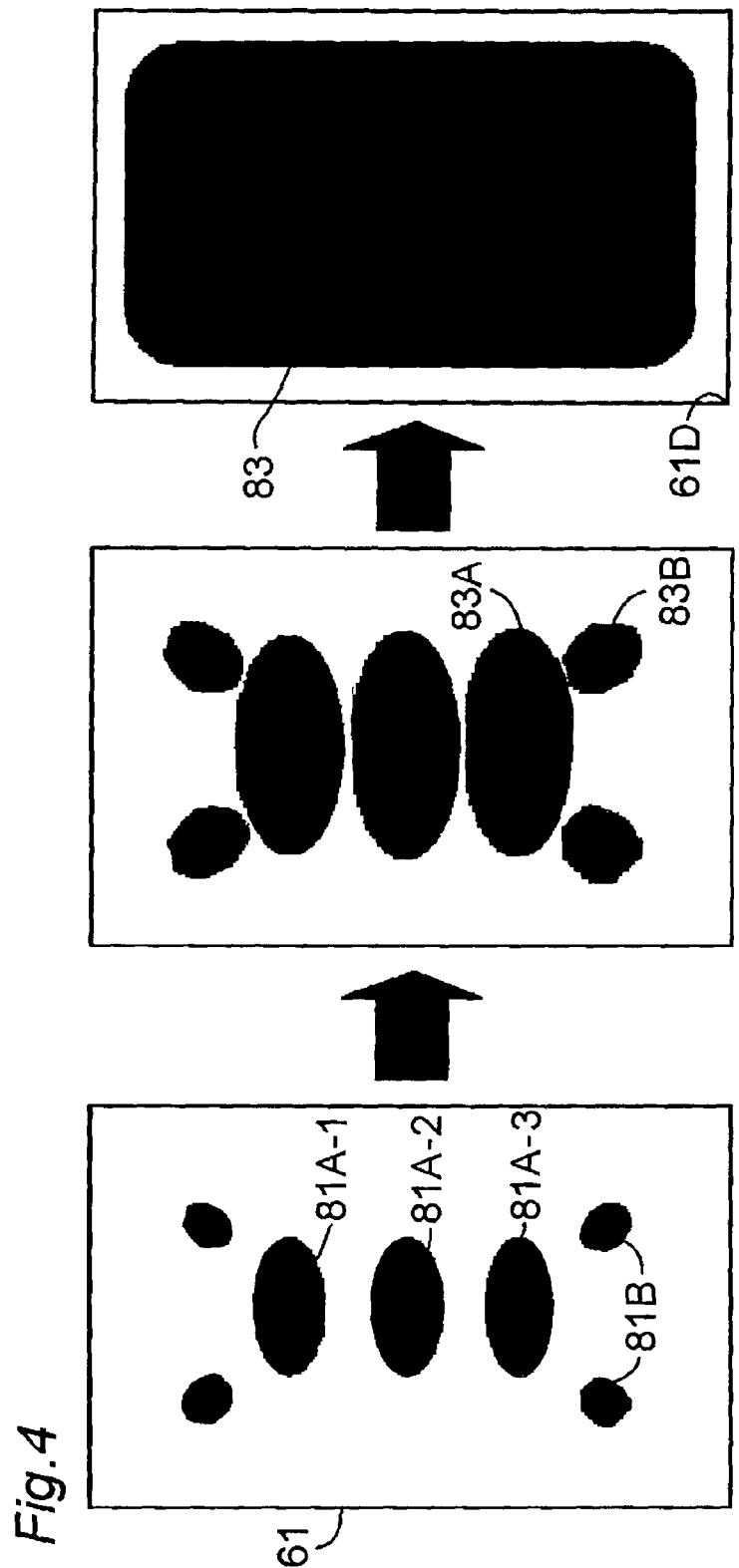
FIG. 4 is a set of plan views of adhesive-resin patterns in the rectangular area on a time course in respect of a reference example and its drawback, where left-hand-side view shows an adhesive-resin application pattern as modified from that of FIG. 3 by omitting dot patterns near corners, a center view shows a state the dot patterns are just to merge with each other by being extended as a result of pressing operation, and a right-hand-side view shows a state just before completing of the pressing operation.

Leftmost part of FIG. 4 shows a reference example modified from that shown in FIG. 3 by omitting the outer-branch dot patterns 81C. As a result of arranging the inner-branch dot patterns 81B, the adhesive resin is quickly and uniformly spreaded to fill a gap between the display panel 5 and the protector sheet 6 on course of the pressing for assembling, not only at center part of the to-be-bonded area 61 but also at regions near short sides of rectangular fringe of the area 61. Nevertheless, only at small regions near the corner of the to-be-bonded area 61, filling with the adhesive resin is not enough. For this reason, the outer-branch dot patterns 81C that are smaller in diameter than the inner-branch dot patterns 81B are arranged in the other examples; and resultantly, by the press-clamping, whole area of the to-be-bonded area 61 is fully filled with the adhesive resin, and in same time, curbed is squeezing out of the adhesive resin beyond a fringe of the to-be-bonded area 61.

As suggested by FIG. 4, when each of the center-line dot patterns 81A is shaped as ellipsoid instead of a circle as in FIG. 1; it is facilitated to shape a pattern of the adhesive resin, as shown in rightermost part of FIG. 4, as homologous to the to-be-bonded area 61 on course of the pressing for assembling. In other words, at a time slightly before the adhesive resin liquid is spreaded to reach the fringes of the to-be-bonded area 61, each fringe of pattern of the adhesive-resin layer 83 runs parallel to the respective fringe of the to-be-bonded area 61 except for vicinity of each of the corners 61D of the to-be-bonded area 61. Moreover, distances from the pattern of the adhesive-resin layer to the four fringes of the to-be-bonded area 61 are same with each other. Meanwhile, center part of the FIG. 4 shows adhesive resin patterns 83A and 83B that still retain discrete island outlines respectively analogous to those of the dot patterns 81A and 81B of the resin-application pattern 81 and are just about to merge with each other. As seen from the center part of FIG. 4, at a time the island outlines of adhesive resin patterns 83A and 83B are merged, collision between the island outlines begins by "point-to-point" collision. Thus, air is smoothly pushed out and escapes from each first collision point in two directions and would not be remained in a pattern of the adhesive layer 83.

FIG. 5 shows another example of the resin-application pattern 81. In this example, the fore-mentioned modified center-line segment 69A is adopted as follows: number of center-line dot patterns 81A-1, 81A-2 and 81A-3 centered on the center line 69 is three; and centers of two of them are arranged at outside of a pair of the Y-shaped intersections 68. In an illustrated detailed example, 42% of length of the to-be-bonded area 61 is equal to a distance between centers of the dot patterns 81A-1 and 81A-3, which is a length of the modified center-line segment 69A. Meanwhile, each of outlines of the inner-branch and outer-branch dot patterns 81B and 81C is shaped as a circle and is centered almost on the branch line 67. In an illustrated detailed example, the to-be-bonded area 61 has a diagonal length of 2.8 inch and an aspect ratio of 1.3; and the center-line dot patterns 81A-1, 81A-2 and 81A-3 have dimensions and shapes same with each other and flattening of 0.5. Each of the inner-branch dot patterns 81B has a center that is slightly deviated outward from a center of the branch line 67; and each of the outer-branch dot patterns 81C has an outline that is abutted with or slightly distanced from a printed pattern 61A disposed on the fringe of the to-be-bonded area 61. As in same manner with the example shown in FIG. 1, the two driver-IC dot patterns 81D are respectively arranged on two corners between the centerline 65 and the fringe of the to-be-bonded area 61, which is at a short side of a rectangle shape on boundary with the terrace area 63. Each of the driver-IC dot patterns 81D has an outline shape of a circle and has a diameter same with that of the inner-branch dot pattern 81B. If the driver-IC dot patterns 81D are neglected, areal ratio with respect to total area of the resin-application pattern 81 is: 67% for sum of the three center-line dot patterns 81A; 20% for sum of the four inner-branch dot patterns 81B; and 13% for sum of the four outer-branch dot patterns 81C. Moreover, areal ratio of total area of the resin-application pattern 81 with respect to total area of the to-be-bonded area 61 is: about 18% if the driver-IC dot patterns 81D are neglected; and about 20% if the driver-IC dot patterns 81D are included.

The resin-application patterns 81 of the embodiments as shown in FIGS. 1, 3 and 5 are advantageous in that: curbed is remaining of air bubbles in the adhesive layer; and in same time, whole area of the to-be-bonded area is efficiently, and in a short time period, filled with the adhesive resin without causing excess and shortage of the resin in any portion. In other words, when the press-clamping is made, filling with the adhesive resin is made in a short period without remaining of any unfilled portion and without causing overflowing of the resin in any portion of the fringes. In particular, such efficient filling without leaving air bubbles and without overflowing is achieved by a procedure under atmospheric pressure and inexpensive equipments.

Figure 8:
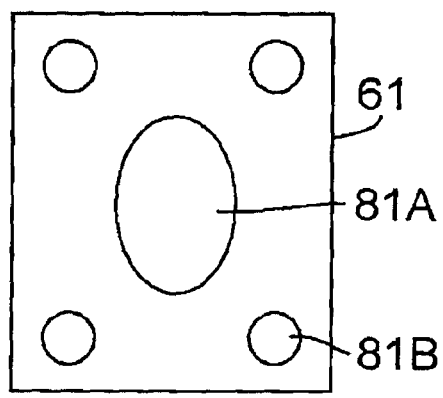
FIG. 8 is a plan view in same manner with FIGS. 1 and 3, showing a further example of an adhesive-resin application pattern.

FIG. 8 shows a further example of an adhesive-resin application pattern. In this example, only one dot pattern 81A is arranged on the center-line segment 6; and major axis of the ellipsoid overlaps the center line 69. And, one circular dot pattern 81B is arranged on each of the branch lines 67.

In here-to explained embodiments, assembling and pressing are made by descending of the press-clamping head 2 that is connected with the vertical-drive supporter 41. Nevertheless, the assembling and pressing in same manner is also achievable by ascending of the press-clamping stage 7 that is connected with the vertical-drive supporter 41. Moreover, if appropriate and feasible, the assembling and pressing may be made from both of the descending and the ascending. Hence, in this application, mere mentioning of descending of the press-clamping head 2 should be construed as relative descending of the press-clamping head 2 with respect to the press-clamping stage 7.

Figure 11:
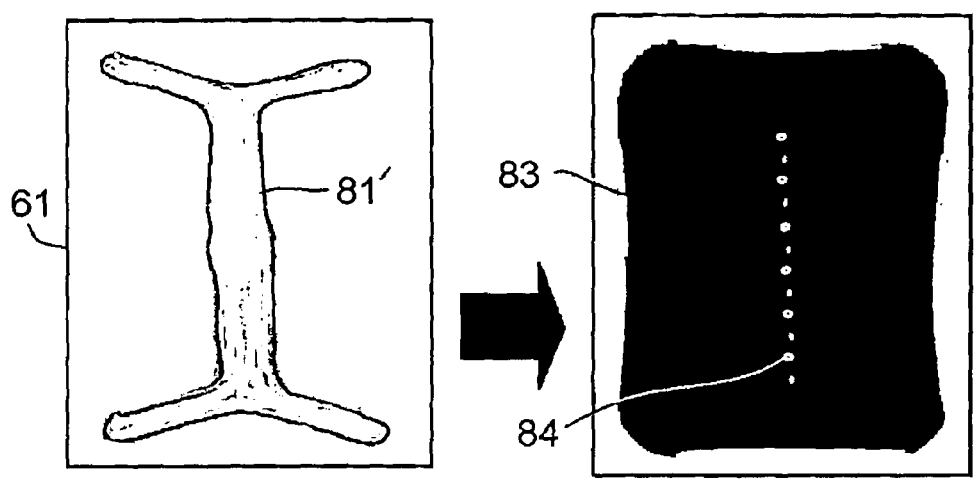
FIG. 11 is a set of plan views of adhesive-resin patterns in the rectangular area on a time course in respect of a comparative example and its drawback, in same manner with FIG. 4.

Left-hand-side part of FIG. 11 shows a resin-application pattern 81' of a comparative example, which is formed of lines. As shown in right-hand-side part of FIG. 11, many air bubbles 84 were remained along the center line 65 after press-clamping was made for such pattern. Moreover, each fringe of a pattern of the adhesive resin layer 83 is not parallel with a respective fringe, or a short or long side of a rectangle, of the to-be-bonded area 61 at a time filling with the resin is about to be completed. Thus, a longer time period of press-clamping is required to spread the adhesive resin all over the to-be-bonded area 61 in a manner to curb the not-filled portion and the overflowing of the resin.

In the above embodiments, it has been explained that a hydraulic mechanism is provided on the press-clamping head 2 as upper-side part of a press apparatus; and pressing to squeezing the adhesive layer is made by moving down of the press-clamping head 2. Nevertheless, the hydraulic mechanism may be provided on the press-clamping stage 7 so that pressing to squeezing the adhesive layer is made by moving up of the press-clamping stage 7. Moreover, if appropriate and feasible, the press-clamping head 2 and the press-clamping stage 7 may be moved simultaneously toward each other. Hence, in the specification, a simple mentioning that "the press-clamping head 2 descends" should be construed that the press-clamping head 2 descends relative to the press-clamping stage 7.

Here-to explained method for attaching a protector sheet on a display panel and the apparatus and devices therefore are applicable not only in manufacturing of LCD devices but also in manufacturing of OLED devices and other flat-panel display devices.

Here-to explained Embodiments and Examples are for sake of presenting some examples and not for defining a scope of the inventions. These novel embodiments are able to be enacted by various ways and manners; and modification, changing and omitting of some elements may be made in various ways and manners without departing from gist of the invention. Each of such various embodiments and modifications falls within a literal scope of the invention or within its equivalents.

What is claimed is:

1. A method for manufacturing a flat-panel display device including a display panel having a transparent insulator substrate and a transparent protector sheet attached on the display panel to cover a viewing area of the display panel; the method comprising:
    applying adhesive resin onto the transparent protector sheet or onto the viewing area of the display panel;
    assembling the display panel and the transparent protector sheet so as to sandwich a layer of the adhesive resin;
    curing the adhesive resin sandwiched between the display panel and the transparent protector sheet, by applying heat or light; and
    setting a bi-directionally Y-shape branched line pattern within a rectangular to-be-bonded area on the transparent protector sheet or on the display panel, the display panel comprising:
        a first Y-shaped intersection that is an intersection of two first angle-bisector lines respectively of two first corners sandwiching a first short side of the rectangular area;
        two first branch lines that are line segments respectively of the two first angle-bisector lines extending between the two first corners and the first Y-shaped intersection;
        a second Y-shaped intersection that is an intersection of two second angle-bisector lines respectively of two second corners sandwiching a second short side of the rectangular area;
        two second branch lines that are line segments respectively of the two second angle-bisector lines extending between the two second corners and the second Y-shaped intersection; and
        a center-line segment that is a line segment of a center line of the rectangular area extending between the first and second Y-shaped intersections,
    wherein said applying of adhesive resin includes forming circular or ellipsoidal dot patterns of applied adhesive resin so that the dot patterns are arranged on or adjacent to the center-line segment and on the branch lines, and that the dot patterns are arranged in symmetry with respect to the center line and to a bisector perpendicular to the center line; and
    wherein an aspect ratio of the rectangular to-be-bonded area is in a range of 1.3 to 2.0; and each of the dot patterns on or adjacent to the center-line segment is ellipsoidal and has a major axis perpendicular to the center line of the rectangular to-be-bonded area.

2. The method according to claim 1, wherein, with respect to total area of the dot patterns or total amount of applied resin on the to-be-bonded area, a ratio or share of sum of the dot patterns on or adjacent to the center-line segment is in a range of 50% to 70%, and a ratio or share of sum of the dot patterns on or adjacent to the branch lines is in a range of 30% to 50%.

3. A method for manufacturing a flat-panel display device including a display panel having a transparent insulator substrate and a transparent protector sheet attached on the display panel to cover a viewing area of the display panel; the method comprising:
　applying adhesive resin onto the transparent protector sheet or onto the viewing area of the display panel;
　assembling the display panel and the transparent protector sheet so as to sandwich a layer of the adhesive resin;
　curing the adhesive resin sandwiched between the display panel and the transparent protector sheet, by applying heat or light; and
　setting a bi-directionally Y-shape branched line pattern within a rectangular to-be-bonded area on the transparent protector sheet or on the display panel, the display panel comprising:
　　a first Y-shaped intersection that is an intersection of two first angle-bisector lines respectively of two first corners sandwiching a first short side of the rectangular area;
　　two first branch lines that are line segments respectively of the two first angle-bisector lines extending between the two first corners and the first Y-shaped intersection;
　　a second Y-shaped intersection that is an intersection of two second angle-bisector lines respectively of two second corners sandwiching a second short side of the rectangular area;
　　two second branch lines that are line segments respectively of the two second angle-bisector lines extending between the two second corners and the second Y-shaped intersection; and
　　a center-line segment that is a line segment of a center line of the rectangular area extending between the first and second Y-shaped intersections,
　wherein said applying of adhesive resin includes forming circular or ellipsoidal dot patterns of applied adhesive resin so that the dot patterns are arranged on or adjacent to the center-line segment and on the branch lines, and that the dot patterns are arranged in symmetry with respect to the center line and to a bisector perpendicular to the center line; and
　wherein a number of the dot patterns on each of the branch lines is two, a first one of the two dot patterns on each of the branch lines being arranged in vicinity of a center of the respective branch line and a second one of the two dot patterns on each of the branch lines being arranged in vicinity of a corner point of the rectangular to-be-bonded area, the second one being smaller than the first one in area and in an amount of applied resin.

4. The method according to claim 3, wherein, with respect to total area of the dot patterns or total amount of applied resin on the to-be-bonded area, a ratio or share of sum of the dot patterns on or adjacent to the center-line segment is in a range of 50% to 70%, and a ratio or share of sum of the dot patterns on or adjacent to the branch lines is in a range of 30% to 50%.

\* \* \* \* \*